(12) United States Patent
Russell et al.

(10) Patent No.: US 9,635,625 B2
(45) Date of Patent: Apr. 25, 2017

(54) METHOD FOR SWITCHING BETWEEN PREDEFINED TRANSMIT POWER CLASSES ON A MOBILE TELECOMMUNICATIONS DEVICE

(75) Inventors: Michael E. Russell, Lake Zurich, IL (US); Thomas E. Gitzinger, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 3482 days.

(21) Appl. No.: 11/320,066

(22) Filed: Dec. 28, 2005

(65) Prior Publication Data

US 2007/0149237 A1 Jun. 28, 2007

(51) Int. Cl.
*H04B 5/00* (2006.01)
*H04B 1/00* (2006.01)
*H04B 7/00* (2006.01)
*H01Q 11/12* (2006.01)
*H04B 1/04* (2006.01)
*H04B 1/38* (2015.01)
(Continued)

(52) U.S. Cl.
CPC ........... *H04W 52/46* (2013.01); *H04W 52/28* (2013.01); *H04W 52/367* (2013.01); *H04W 28/18* (2013.01); *H04W 52/281* (2013.01); *H04W 52/288* (2013.01); *H04W 84/18* (2013.01)

(58) Field of Classification Search
CPC ... H04W 52/28; H04W 52/46; H04W 52/281; H04W 52/288; H04W 52/367; H04W 28/18; H04W 84/18

USPC .... 455/41.1, 41.2, 41.3, 522, 523, 524, 421, 455/422.1, 69, 127.1, 127.3, 411, 436, 455/67.11, 63, 67.1, 73, 91, 115.1, 115.2, 455/115.3, 115.4, 126, 419, 57, 5.6, 455/575.9, 569.1, 1, 575.6, 127.2, 571; 370/318, 335, 338, 328, 401, 402, 404, 370/405; 330/51, 151, 124, 265, 277, 330/285
See application file for complete search history.

(56) References Cited

U.S. PATENT DOCUMENTS 6,745,027 B2 * 6/2004 Twitchell, Jr. ............. 455/422.1
7,136,667 B2 * 11/2006 Lilja et al. .................... 455/522
(Continued)

FOREIGN PATENT DOCUMENTS

WO WO 2004100461 A1 * 11/2004

*Primary Examiner* — Yuwen Pan
*Assistant Examiner* — Paul P Tran
(74) *Attorney, Agent, or Firm* — Byrne Poh LLP

(57) ABSTRACT

In a method of controlling power level of transmit signals from a wireless communication device that is communicating with a plurality of wireless ad-hoc network nodes as part of an ad-hoc network, a value of a usage parameter of a communication between the wireless device and a first wireless ad-hoc network node of the plurality of nodes is detected. A power level of a transmit signal from the wireless device to the first wireless ad-hoc network node is set to a level corresponding to the value of the usage parameter. A device for adjusting a power level in a wireless device includes a parameter detection circuit, that detects a parameter indicative of a relationship between the wireless device and a wireless ad-hoc network node, and a power selection circuit that sets a transmit signal power level from the wireless device to a level corresponding to the parameter detected by the parameter detection circuit.

10 Claims, 3 Drawing Sheets

(51) Int. Cl.
*H03F 1/14* (2006.01)
*H03F 3/68* (2006.01)
*H04B 7/185* (2006.01)
*H04B 7/216* (2006.01)
*H04R 25/00* (2006.01)
*H04W 52/46* (2009.01)
*H04W 52/28* (2009.01)
*H04W 52/36* (2009.01)
*H04W 28/18* (2009.01)
*H04W 84/18* (2009.01)

(56) References Cited

U.S. PATENT DOCUMENTS

| | | | |
|---|---|---|---|
| 7,209,468 B2* | 4/2007 | Twitchell, Jr. | 370/338 |
| 7,693,119 B2* | 4/2010 | Lee et al. | 370/338 |
| 2001/0051530 A1* | 12/2001 | Shiotsu et al. | 455/522 |
| 2002/0098860 A1* | 7/2002 | Pecen et al. | 455/522 |
| 2003/0050009 A1 | 3/2003 | Kurisko et al. | |
| 2004/0106408 A1* | 6/2004 | Beasley et al. | 455/436 |
| 2004/0209639 A1 | 10/2004 | Kamperschroer et al. | |
| 2005/0090211 A1 | 4/2005 | Lilja et al. | |
| 2005/0093703 A1* | 5/2005 | Twitchell, Jr. | 340/572.8 |
| 2005/0272457 A1* | 12/2005 | Nichols et al. | 455/522 |
| 2006/0018289 A1* | 1/2006 | Schulist | H04W 52/50 370/335 |
| 2006/0128305 A1* | 6/2006 | Delalat | 455/41.2 |
| 2006/0153106 A1* | 7/2006 | Laakso | H04B 3/36 370/282 |
| 2007/0018720 A1* | 1/2007 | Wright | 330/51 |
| 2007/0060132 A1* | 3/2007 | Wilhelmsson et al. | 455/445 |

* cited by examiner

METHOD FOR SWITCHING BETWEEN PREDEFINED TRANSMIT POWER CLASSES ON A MOBILE TELECOMMUNICATIONS DEVICE

BACKGROUND OF THE INVENTION

Field of the Invention

The present invention relates to wireless communications systems and, more specifically, to a system that manages the power level of transmitted signals in an ad-hoc communications system.

Background of the Invention

An ad-hoc network is a local area network or other small network, especially one with wireless connections, in which some of the communication devices form a somewhat informal impromptu network, which is sometimes established for temporary communication independent of a dedicated infrastructure, which can require a degree of proximity depending upon the particular network. The wireless device communication system known as Bluetooth® was designed to allow wireless devices to interact with each other in a more informal manner by providing a framework in which to establish ad-hoc networks. In one configuration, a wireless device communicates with a wireless ad-hoc network node. The Bluetooth® specification is an open specification that is governed by the Bluetooth® Special Interest Group (SIG), Inc. The Bluetooth® SIG classifies Bluetooth® devices according to three different power classes, as follows:

| Power Class | Maximum Output Power |
|---|---|
| 1 | 100 mW (20 dBm) |
| 2 | 2.5 mW (4 dBm) |
| 3 | 1 mW (0 dBm) |

Many portable Bluetooth® devices are in Power Class 1 or 2 due to cost and battery life issues. Typically, a Class 1 device requires use of a power control to limit the transmitted power. This will provide up to 100 m of range—sufficient for home networking and other similar applications.

The majority of Bluetooth® devices currently in the market have approximately a 10 meter range. This is sufficient for many point to point communication applications, such as those involving communications with headsets, handsfree car kits, PIM transfers, etc., but as one starts to enter different personal area networks within the home, business, and mobile world, a 10 meter range may be insufficient for seamlessly transitioning between these different environments. Some point to point scenarios (such as communicating with a printer server) require a greater range. For some point to point scenarios, a longer range can improve the user experience by allowing greater freedom of mobility while supporting and maintaining continued communication, even though as the distance between communication participants decrease the shorter Class 2 range would be sufficient for operation and even preferred when battery power is low.

Existing wireless devices are often not configured to dynamically adjust power level of the transmit signal, when the range between the wireless device and the node with which it is communicating changes, including instances in which the appropriateness and/or suitability of a lower power level could be detected. In absence of the capability to dynamically adjust power levels, different applications will often set the level to the maximum level supported by the application. By allowing the dynamic adjustment of the power level, the power usage requirements for supporting the communication can be reduced. This can result in reduced time between battery charges. Also, transmitting an unnecessarily high power level of the transmit signal from a wireless device increases the likelihood that an eavesdropper will be able to intercept the communication.

Consequently, a method that switches between different power levels of the transmit signal according to the range (or other parameter) in support of a communication between the wireless device and another wireless ad-hoc network node would be beneficial.

SUMMARY OF THE INVENTION

The present invention provides for a method of controlling power level of transmit signals from a wireless device that is communicating with one or more other wireless communication apparatus as part of an ad-hoc network. A value of a usage parameter of a communication between the wireless device and the one or more other wireless communication apparatus is detected. A power level of a transmit signal from the wireless device to the one or more other wireless communication apparatus is set to a level corresponding to the value of the usage parameter.

In another aspect, the invention is a method of controlling power level of the transmit signals from a wireless device that is communicating with one or more other wireless communication apparatus as part of an ad-hoc network. A first value of a usage parameter of a communication between the wireless device and a first one of the one or more other wireless communication apparatus is detected. A power level of a transmit signal from the wireless device to the first one of the one or more other wireless communication apparatus is set to a first power level corresponding to the first value. A second value of a usage parameter of a communication between the wireless device and a second one of the one or more other wireless communication apparatus is detected. A power level of a transmit signal from the wireless device to the second one of the one or more other wireless communication apparatus is set to a second power level corresponding to the second value, different from the first power level.

In another aspect, the invention is a method of applying a power level of the transmit signal in a wireless communication device that communicates with a wireless ad-hoc network node. A value of a parameter corresponding to a range from the wireless communication device to the wireless ad-hoc network node is detected. A transmit signal is generated from the wireless communication device. The transmit signal has a first predetermined power level when the value of the parameter indicates that the wireless communication device is within a first predetermined range of the wireless ad-hoc network node and has a second predetermined power level, higher than the first predetermined power level, when the value of the parameter indicates that the wireless communication device is outside the first predetermined range and within a second predetermined range of the wireless ad-hoc network node.

In yet another aspect, the invention is a device for adjusting a power level in a wireless device that includes a parameter detection circuit and a power selection circuit. The parameter detection circuit detects a parameter indicative of a relationship between the wireless device and a wireless ad-hoc network node. The power selection circuit causes the wireless device to generate a transmit signal so as to have a first power level when the parameter detection circuit indicates that the wireless device is within a first relationship to the wireless ad-hoc network node and causes the wireless device to generate the transmit signal so as to have a second power level, higher than the first power level, when the parameter detection circuit indicates that the wireless device is outside of the first relationship and within a second relationship of the wireless ad-hoc network node.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
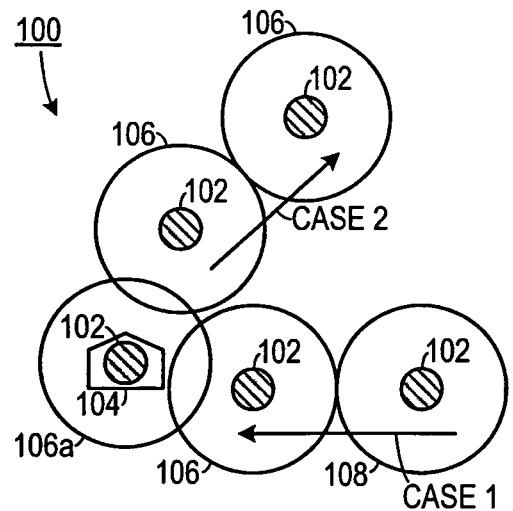
FIG. 1A is a schematic diagram showing a wireless device interacting with one or more other wireless communication apparatus, or wireless ad-hoc network nodes at different ranges.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In one representative embodiment, the invention includes a system for adjusting a transmit signal power level from a wireless device to a wireless ad-hoc network node that is part of an ad-hoc network to correspond to a value of a usage parameter. The usage parameter could be a measurable quantity, such as the power level of a signal received from the wireless ad-hoc network node to the wireless device. The wireless device then sets the power level of the transmit signal from the wireless device to a level corresponding to the value of the usage parameter. For example, if the received signal is weak, indicating that the network node could be far away, then the transmit signal would be set at a relatively high power level; on the other hand, if the received signal is strong, indicating that the network node could be near by, then the transmit signal would be set at a relatively low power level. The system could be configured to allow the wireless device to communicate with a plurality of network nodes, with the transmit signal to different network nodes being set at different power levels. Thus, the system could facilitate the wireless device making and breaking communications with different network nodes as the wireless device transitions through different geographic areas.

An example of the wireless device 102 transitioning through different geographic areas is shown in FIG. 1A, in which in a first transition cases (CASE 1) that is centered on the home 104, the user's wireless device 102 is initially outside of the range 106a of the home 104 network of devices The user's wireless device 102 may even be communicating with a cellular node 108. At this point, the user's device will operate with a Class 1 (100 meter) range. By having this increased range, the home's network can route any messages to the user locally, through the short range radio, rather than through the cellular network, or other broadband system, and can receive commands from the user (e.g., "turn on lights," "turn on television," or "start stereo," etc.) using the local communications system (versus a cellular network). Thus, the user can have everything set up by the time he enters the house. Once the user is situated in the home environment, his wireless device 102 can switch to a shorter range power class to reduce power consumption. In the second transition case (CASE 2), the user is leaving the home 104 and, upon leaving the power Class 2 (10 meter) range, the device switches to the Class 1 range and can finish transferring any data or issuing any commands before the user gets out of the Class 1 range. As the user is leaving, the home network can then transition back to an away mode and route any messages through a cellular telephone network or broadband system.

Figure 1B:
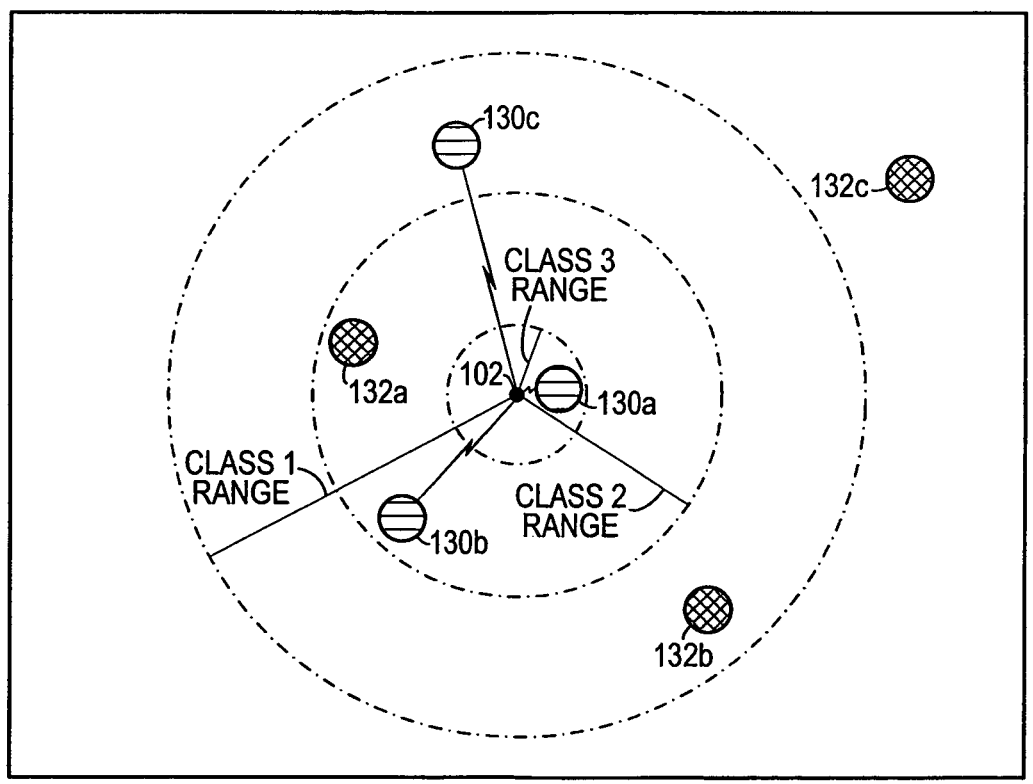
FIG. 1B is a schematic diagram showing interaction between a wireless device, trusted devices and attempted eavesdroppers at different ranges.

The ranges of different power classes are shown in FIG. 1B. (It should be noted that the ranges are not drawn to scale and are not directed to a specific ad-hoc network technology.) As shown in FIG. 1B, the user might wish to communicate simultaneously with different trusted wireless ad-hoc network nodes 130, but there is a likelihood that attempted eavesdropper nodes 132 could be attempting to intercept communications between the user's device 102 and the trusted nodes 130. In this scenario, minimizing the power level of the signal output by the user's device 102 for each communication would reduce the probability that an attempted eavesdropper 132 could intercept a communication. While a Class 1 (100 meter range) would be useful in the home and out in the world, the longer range can increase the possibility of eavesdropping. Many typical wireless devices include a means for encryption involving a public link key and a private pin, but it is possible that the communications could be intercepted and decrypted at a later time; it is also possible for the user's link key to be intercepted. By dropping the power level, the user can decrease the range between the wireless device and a trusted device, thereby preventing eavesdroppers from intercepting communications. In the proposed implementation, due to the time slotted nature of Bluetooth®-type nodes that have two RF paths, connections would be allowed from one user to multiple devices using different power levels for secure and non-secure transactions.

In the example shown, the user's wireless device 102 is communicating with a plurality of trusted devices 130a-c as part of an ad-hoc network. In the network, the power level of the transmit signal from the user's wireless device 102 is set at a power level that corresponds to the distance between the user's wireless device 102 and the specific trusted device being communicated with. This has the advantage of limiting the opportunities for attempted eavesdroppers 132a-c to intercept a given communication. For example, while the user's wireless device 102 is communicating with trusted device 130a, it transmits a signal having a power level corresponding to the Class 3 range. Because of the limited transmit power level; attempted eavesdroppers 132a-c would have a lower probability of being able to intercept the transmitted signal. While the user's wireless device 102 is communicating with trusted device 130b, it transmits a signal having a power level corresponding to the Class 2 range. At this power level, attempted eavesdropper 132a would be within the normal range to monitor communications, though it may still require an additional effort to decrypt, while the potential for attempted eavesdroppers 132b-c to intercept the signal would be greatly reduced.

Figure 2:
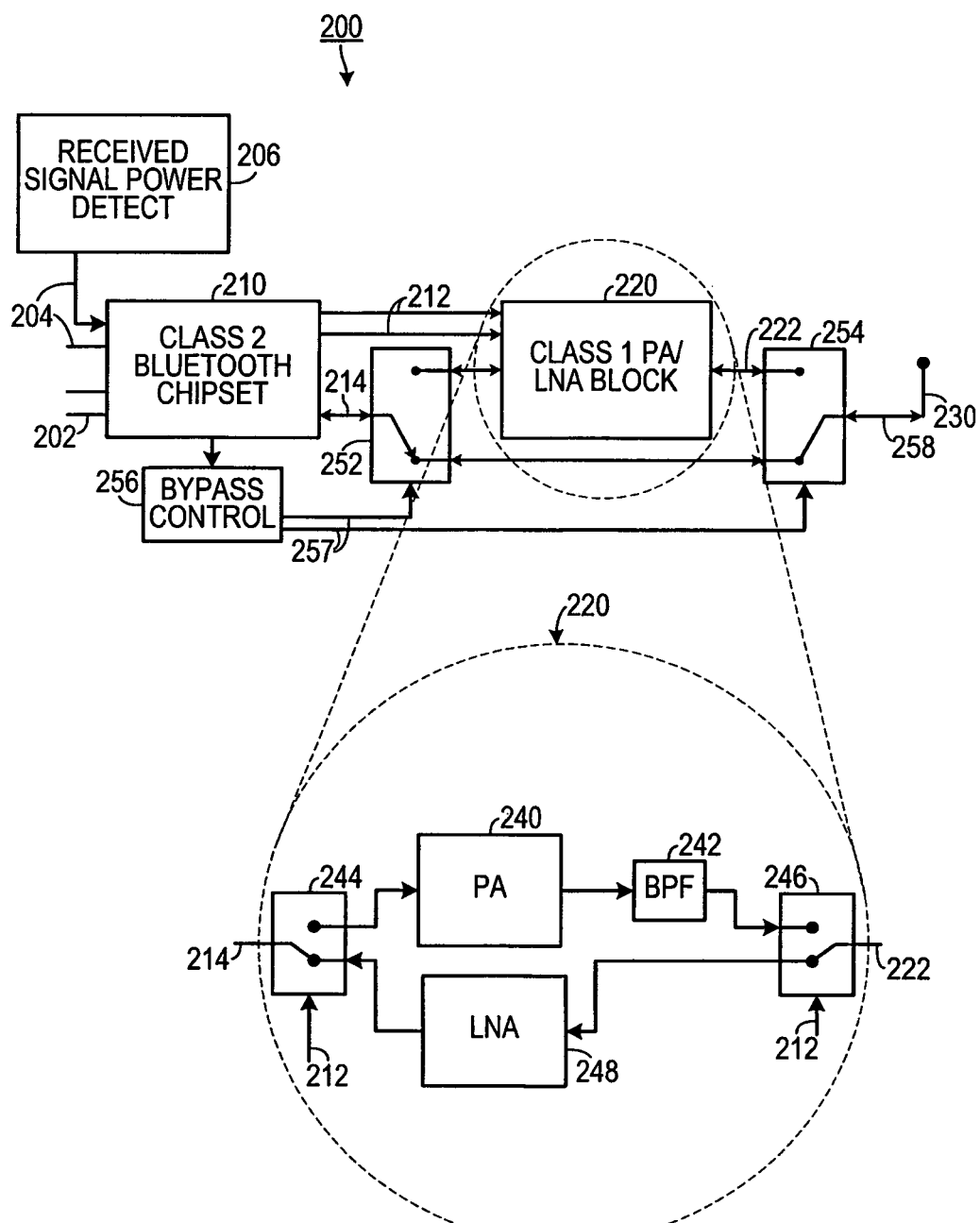
FIG. 2 is a schematic diagram of one exemplary embodiment of a circuit in a wireless device that may be used to change power classes.

One example of a circuit 200 to enable the present invention is shown in FIG. 2. The circuit includes a chipset 210 corresponding to the network standard being used. The chipset 210 is responsive to communications signals 202 and control inputs 204. One of the control inputs 204 is from a received signal power level detecting circuit 206. The chipset 210 is in communication with a power amplifier/low noise amplifier (PA/LNA) block 220 that selectively amplifies the communications signal 214 (both the outgoing signal and the received) to and from the chipset 210. The PA/LNA block 220 is responsive to a pair of control signals 212 from the chipset 210, which determine whether the output signal 222 from the PA/LNA block has a Class 1 power level or a Class 2 power level. The PA/LNA block 220 includes a first direction switch 244 and a second direction switch 246 that causes the communications signal to be amplified by a power amplifier 240 and a band pass filter 242 (optional) when transmitting and to pass through a low noise filter 248 when receiving. The states of the first direction switch 244 and the second direction switch 246 are controlled by the pair of control signals 212.

A first bypass switch 252 and a second bypass switch 254 provide selective isolation of the PA/LNA block 220. A bypass control circuit 256 controls the first bypass switch 252 and the second bypass switch 254 via a pair of bypass control signals 257.

The standard chipset 210 may be selectively configured into either a Class 3 power level or a Class 2 power level. (It should be noted that when referring to different classes of power level, the example used herein corresponds to a standard ad-hoc network scheme. Thus, the Class 1 power level is the highest power level, the Class 2 power level is the mid-range power level and the Class 3 power level is the lowest power level. It should be understood that these power classes are given for illustration only and that many other power level classification schemes may be used without departing from the scope of the invention, as would be well understood by those of skill in the communication systems art.) When a Class 1 power level is desired, the chipset 210 is configured into the Class 2 power level and the first bypass switch 252 and the second bypass switch 254 are set to cause the communications signal 214 to go into the PA/LNA block 220. When a Class 2 power level is desired, the first bypass switch 252 and the second bypass switch 254 are set to cause the communications signal 214 to bypass the PA/LNA block 220. When a Class 3 power level is desired, the second bypass switch 254 are set to cause the communications signal 214 to bypass the PA/LNA block 220 and the chipset 210 is configured into the Class 3 level.

Figure 3:
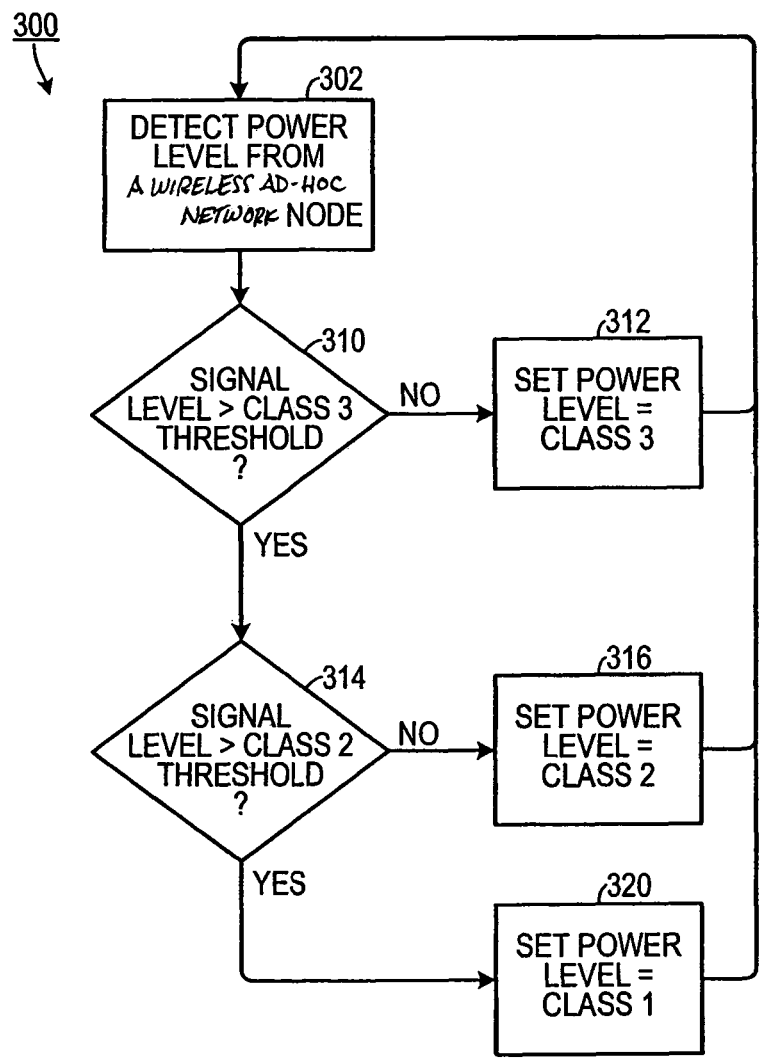
FIG. 3 is a flow diagram that may be used to control selection of power classes.

A flow diagram 300 for system control is shown in FIG. 3, in which the system initially detects 302 the received signal power level (or another usage parameter, such as distance) of a communication from a wireless ad-hoc network node and then sets the power level of the signal transmitted signal from the wireless device to a predetermined level corresponding to the usage parameter, such as a communication parameter indicative of communication integrity. To do this, the system determines 310 if the received signal power level indicates that the system should be in greater than a Class 3 mode. If not, the system sets 312 the power level to Class 3. Otherwise, the system determines 314 if the received signal power level indicates that the system should be in greater than a Class 2 mode. If not, the system sets 316 the power level to Class 2. Otherwise, the system sets 320 the power level to Class 1.

For multipoint personal area networks (PANs) to detect user transitions and seamlessly handoff control between different zones, a range of more than 10 meters may be desired. A 100 meter range would be more ideal for detecting and moving a user's content or automatically switching from a personal area network to different modes. After the user is more centralized in this area the user's mobile device can switch to the shorter range to save battery power and increase device's battery life in the personal area network.

Use of a Class 1 range is not necessary for all devices, but it could increase the functionality and improve the user experience by increasing the user's mobility. One area where having Class 1 range is very useful is for transitioning into and out of different PAN's. By having up to 10 times greater range, handoffs and synchronizations can be greatly improved when moving into and out of different zones. When the user first comes into range of home with the Class 1 range on, the user can cause the home computer to take certain actions, such as: synchronize appointments with his calendaring software on his computer, check sensor levels, turn on the lights, set up the television to view their favorite program, etc. Once he is within a 10 meter range of the connected devices, the device can switch to the Class 2 power level and save battery power on their mobile device. If the user begins to move out of the 10 meter range, the device can switch back to the 100 meter range to finish whatever activity the user was doing and change the mode of the network to being away. Switching between the 100 meter and 10 meter range also introduces an element of safety concerning user data.

The electrical portion of this switching could be implemented by adding another RF path to the device as can be seen in FIG. 3. Many current Class 1 reference designs are implemented using a Class 2 Bluetooth® chipset, with internal variable gain amplifier and an external PA with a fixed gain. Some also include an LNA on the receive path to increase receiver sensitivity and improve the Class 1 to Class 2 link budget. This could also be done using a variable gain amplifier for the PA and one RF path, but having two RF paths allows the user to be connected to multiple devices at different power levels because the second set of RF switches can be used to change which RF power path is used for the corresponding timeslot, similar to the TX/RX switching. For example a phone could be connected to a stereo device using Class 1 range and also connected to a Bluetooth® access point using Class 3 range to make a secure transaction. This implementation would allow you to have a greater than 30 dBm difference in output power between transmission timeslots.

The system detects a usage parameter, such as a power condition (which could correspond to a received signal power level or a detected range) or a security condition of a communication between the wireless device and the wireless ad-hoc network node. The system sets the power level of the transmit signal to a first power level when the usage parameter indicates that the first power level is indicated and sets the power level of the transmit signal to a second power level when the usage parameter indicates that the second power level is indicated. The power level may be set by reducing power level of the transmit signal when a higher security level is desired. This hampers attempted interception of a transmit signal from the wireless device to the wireless ad-hoc network node. Typically, the wireless device will be capable of communicating simultaneously with a plurality of wireless ad-hoc network node and the system will set the proper transmit power level for each communication.

In one embodiment, the first power level (e.g., the Class 3 power level in a BlueTooth® embodiment) has a maximum output power of 1 mW, the second power level (e.g., the Class 2 power level in a BlueTooth® embodiment) has a maximum output power of 2.5 mW, and the third power level (e.g., the Class 1 power level in a BlueTooth® embodiment) has a maximum output power of 100 mW.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of controlling power level of the transmit signals from a wireless device that is communicating with more than one other wireless communication apparatus as part of an ad-hoc network, comprising the steps of:
   a. detecting a first value of a usage parameter of a communication between the wireless device and a first one of the more than one other wireless communication apparatus;
   b. setting in the wireless device a power level of a transmit signal for transmitting a message from the wireless device to the first one of the more than one other wireless communication apparatus to a first power level corresponding to the first value;
   c. detecting a second value of a usage parameter of a communication between the wireless device and a second one of the more than one other wireless communication apparatus;
   d. setting in the wireless device a power level of a transmit signal for transmitting a message from the wireless device to the second one of the more than one other wireless communication apparatus to a second power level corresponding to the second value, different from the first power level, while maintaining an active communication connection with the first one of the more than one other wireless communication apparatus at the first power level.

2. The method of claim 1, wherein the usage parameter corresponds to a power level of a signal received from the more than one other wireless communication apparatus.

3. The method of claim 1, wherein the usage parameter corresponds to a detected range between the wireless device and the more than one other wireless communication apparatus.

4. The method of claim 1, wherein the usage parameter comprises a security condition.

5. The method of claim 4, wherein power level setting step includes reducing a power level of the transmit signal when a higher security level is desired, thereby reducing the power level of the transmit signal to a level that minimally maintains a signal quality level between the wireless device and the more than one other wireless communication apparatus.

6. The method of claim 1, wherein the first power level comprises a maximum output power of 1 mW and wherein the second power level comprises a maximum output power of 2.5 mW.

7. The method of claim 1, wherein the first power level corresponds to BlueTooth® standard power Class 3 and wherein the second power level corresponds to BlueTooth® standard power Class 2.

8. A power adjustment module for adjusting a communication power level in a wireless device, comprising:
   a. a signal detection circuit that detects a signal and identifies a value of a parameter indicative of a relationship between the wireless device and a wireless ad-hoc network node;
   b. a power selection circuit that causes the wireless device to generate a transmit signal so as to have a first power level when the signal detection circuit indicates that the parameter has a first value and that causes the wireless device to generate the transmit signal so as to have a second power level, higher than the first power level, when the signal detection circuit indicates that the parameter has a second value, different from the first value;
   c. a first RF path and a second RF paths, each path being associated with a different one of the first power level and the second power level; and
   d. a set of RF switches coupled to the power selection circuit and the first RF path and the second RF path for selecting the particular one of the first RF path and the second RF path is used for a corresponding timeslot, in order to support different respective power levels associated with the transmit signal for transmitting a message of an active concurrent communication connection with a respective one of more than one different wireless ad-hoc network nodes, wherein the transmit signal to different wireless ad-hoc network nodes is set to different power levels, while maintaining multiple active communication connections with different ones of the wireless ad-hoc network nodes.

9. The module of claim 8, wherein the relationship corresponds to a range between the wireless device and the wireless ad-hoc network node.

10. The module of claim 8, wherein the relationship corresponds to a received signal power level of a signal received from the wireless ad-hoc network node.

* * * * *